(12) United States Patent
Herden et al.

(10) Patent No.: US 8,146,553 B2
(45) Date of Patent: Apr. 3, 2012

(54) SPARK PLUG FOR AN INTERNAL COMBUSTION ENGINE AND METHOD FOR THE OPERATION THEREOF

(75) Inventors: Werner Herden, Gerlingen (DE); Manfred Vogel, Ditzingen (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 506 days.

(21) Appl. No.: 12/308,203

(22) PCT Filed: Jun. 4, 2007

(86) PCT No.: PCT/EP2007/055450
§ 371 (c)(1),
(2), (4) Date: May 18, 2009

(87) PCT Pub. No.: WO2008/000587
PCT Pub. Date: Jan. 3, 2008

(65) Prior Publication Data
US 2010/0031909 A1    Feb. 11, 2010

(30) Foreign Application Priority Data
Jun. 29, 2006   (DE) .................. 10 2006 029 989

(51) Int. Cl.
*F02P 23/04*   (2006.01)

(52) U.S. Cl. .................................. 123/143 B
(58) Field of Classification Search ............... 123/143 B
See application file for complete search history.

(56) References Cited

U.S. PATENT DOCUMENTS

| | | | | |
|---|---|---|---|---|
| 4,523,552 A | * | 6/1985 | Mukainakano et al. | .. 123/143 B |
| 5,756,924 A | | 5/1998 | Early | |
| 6,053,140 A | * | 4/2000 | Feichtinger et al. | ...... 123/143 B |
| 6,676,402 B1 | * | 1/2004 | Early et al. | .......................... 431/1 |
| 6,903,357 B2 | * | 6/2005 | Robb | ............................ 250/554 |
| 2006/0037572 A1 | | 2/2006 | Yalin et al. | |

FOREIGN PATENT DOCUMENTS

| | | |
|---|---|---|
| DE | 37 36 442 | 5/1988 |
| JP | 63-135717 | 6/1988 |
| JP | 2005-233694 | 9/2005 |
| WO | 98/11388 | 3/1998 |

* cited by examiner

*Primary Examiner* — Erick Solis
(74) *Attorney, Agent, or Firm* — Kenyon & Kenyon LLP

(57) ABSTRACT

A spark plug for an internal combustion engine having a light guide device for supplying the spark plug with optical radiant power. A sensor arrangement is at least partially integrated into the spark plug but disposed outside the light guide device, and is embodied for the acquisition of operating data of the spark plug and/or of a combustion chamber associated with the spark plug.

11 Claims, 2 Drawing Sheets

SPARK PLUG FOR AN INTERNAL COMBUSTION ENGINE AND METHOD FOR THE OPERATION THEREOF

FIELD OF THE INVENTION

The present invention relates to a spark plug for an internal combustion engine having a light guide device for supplying the spark plug with optical radiant power. The present invention further relates to a method for operating a spark plug of this kind.

BACKGROUND OF THE INVENTION

An ignition device having a laser is discussed in DE 199 11 737 or DE 101 45 944.

Spark plugs and operating methods of the kind cited above are used in particular in laser-based ignition systems of internal combustion engines. It is known to use the light guide device provided for supplying the spark plug with optical radiant power, such as pump light, to acquire optical operating data of a combustion chamber associated with the spark plug, or of the spark plug itself. In this context, optical operating data are correspondingly transferred from the combustion chamber via the light guide device to an evaluation apparatus, usually necessitating a separation of said optical data from the pump light.

In addition, the above-described known manner of ascertaining optical operating data from the spark plug or from a combustion chamber associated therewith is not usable with conventional spark plugs that have an integrated ignition laser.

SUMMARY OF THE INVENTION

It is accordingly an object of the present invention to improve a spark plug and an operating method of the kind cited above in such a way as to make possible simpler and more flexible evaluation of operating data of the spark plug.

This object is achieved according to the present invention, in the context of a spark plug of the kind cited initially, in that a sensor arrangement at least partially integrated into the spark plug but disposed outside the light guide device, which arrangement is embodied for the acquisition of operating data of the spark plug and/or of a combustion chamber associated with the spark plug, are provided.

Because the sensor arrangement is disposed, according to the present invention, outside the light guide device, the problem known from the existing art of separating the different optical signals does not occur.

As a further manner of achieving the object of the present invention, a spark plug according to Claim 7 is indicated. The spark plug, having an integrated ignition laser, is characterized in that the ignition laser is at least partially transparent to light of a first wavelength region that is radiated from a combustion chamber into the spark plug, the first wavelength region may be extending from approximately 200 nm to approximately 800 nm; and that the light guide device has associated with it an optical beam splitter for separating light of the first wavelength region from the pump light. Because the ignition laser and its components are embodied, according to the present invention, to be transparent to a wavelength region of interest of optical operating data, a physically small configuration can be achieved even with such spark plug types, and at the same time enables optical monitoring of operation of the spark plugs and of processes in the combustion chamber.

A combination of the transparent ignition laser according to the present invention with a further sensor arrangement disposed outside the light guide device is likewise conceivable.

Further advantageous embodiments of the present invention are the subject matter of the dependent claims.

Further features, potential applications, and advantages of the invention are evident from the description below of exemplifying embodiments of the invention that are depicted in the Figures of the drawings. All features described or depicted, of themselves or in any combination, constitute the subject matter of the invention, irrespective of their grouping in the claims or their internal references, and irrespective of their presentation and depiction in the description and the drawings, respectively.

DETAILED DESCRIPTION

Figure 1:
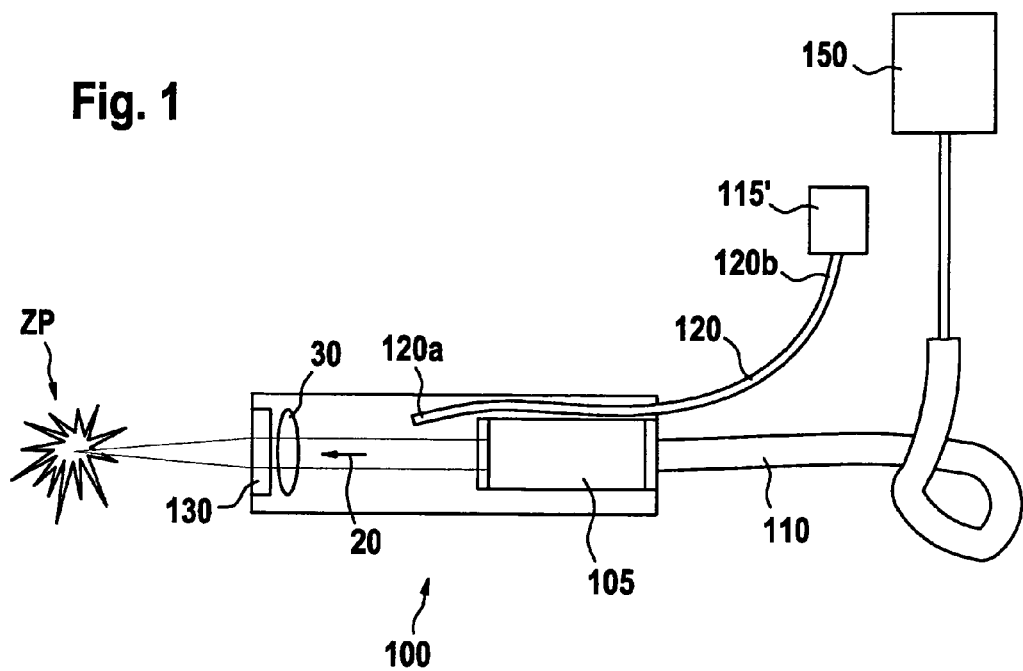
FIG. 1 shows a first embodiment of the spark plug according to the present invention.

FIG. 1 schematically depicts a spark plug 100 according to the present invention for an internal combustion engine. Spark plug 100 has a light guide device 110, embodied in the present case as a light-guiding fiber, that supplies spark plug 100 with light that is made available by a light source 150.

Light source 150 can be, for example, a pump light source that supplies pump light to a laser-active solid 105, provided in spark plug 100, of an integrated ignition laser. Ignition laser thereupon, in known fashion, generates laser pulses (cf. arrow 20) that are emitted through combustion chamber window 130, disposed at a left end (in FIG. 1) of spark plug 100, into an adjacent combustion chamber of the internal combustion chamber. An optical system, symbolized in the present case by lens 30, can be provided in order to focus laser pulses 20 onto an ignition point ZP located in the combustion chamber, and onto fuel present in that region.

A sensor arrangement is provided in order to monitor proper operation of spark plug 100 according to the present invention; in the embodiment according to FIG. 1, said arrangement encompasses a separate light guide device 120 as well as an optoelectric converter 115'. As is evident from FIG. 1, a first end 120a of separate light guide device 120 is disposed directly in spark plug 100 according to the present invention, so that optical signals representing operating data can be coupled from the interior of spark plug 100 into separate light guide device 120. Optical signals of this kind can be created, for example, upon ignition or combustion of fuel present in the combustion chamber; in particular, a wavelength region from approximately 200 nm to approximately 900 nm can contain data of interest. These optical signals penetrate through combustion chamber window 130 into the interior of spark plug 100 according to the present invention, and can thus couple directly into separate light guide device 120.

A second end 120b of separate light guide device 120 may be disposed outside spark plug 100 and is optically connected to optoelectric converter 115' which can be, for example, a photodiode. Optoelectric converter 115' converts the optical signals, received from spark plug 100 via separate light guide device 120, into corresponding electrical signals, which can be evaluated if applicable by a downstream evaluation unit (not illustrated in FIG. 1).

Advantageously, the problem of separating the pump light of light source 150 from the optical operating data deriving, for example, from fuel combusting in the combustion chamber does not arise with spark plug 100 according to the present invention as shown in FIG. 1.

First end 120*a* of separate light guide device 120 can also, for example, be disposed inside spark plug 100 in such a way that laser pulses generated by the integrated ignition laser couple, at least in part, directly into separate light guide device 120. This ensures immediate monitoring of the operation of the integrated ignition laser of spark plug 100.

Alternatively or in supplementary fashion, first end 120*a* of separate light guide device 120 can also be disposed in spark plug 100 in such a way that, as already described, radiation entering the interior of spark plug 100 through combustion chamber window 130 couples at least in part into separate light guide device 120.

The use of multiple separate light guides 120 is also conceivable.

Figure 2:
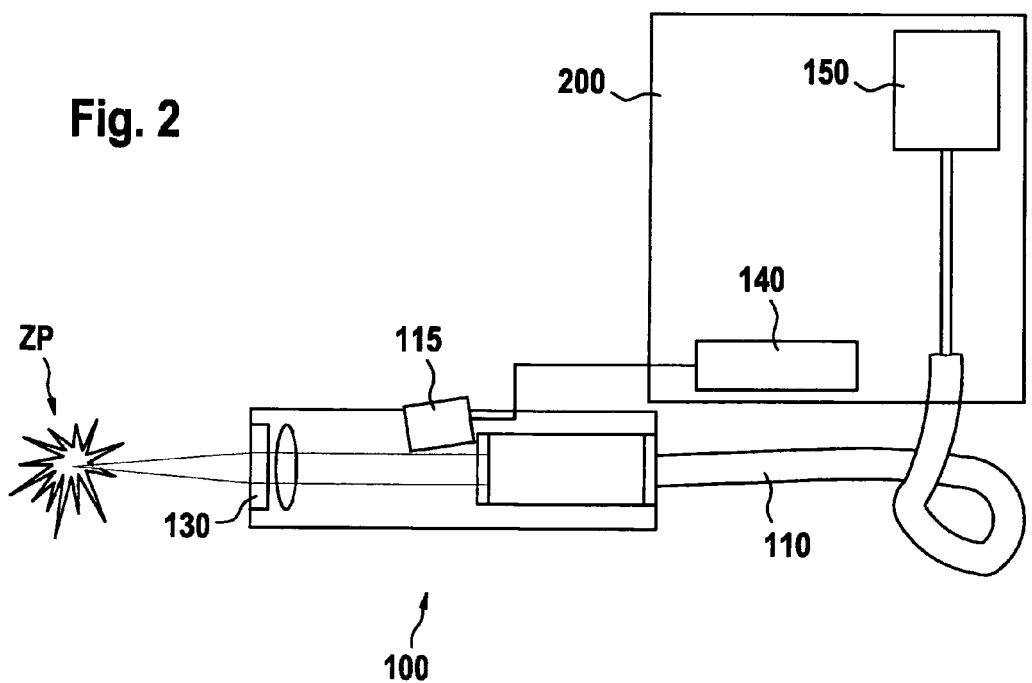
FIG. 2 shows a second embodiment of the spark plug according to the present invention.

A further embodiment of spark plug 100 according to the present invention is illustrated in FIG. 2. In contrast to the exemplifying embodiment described above with reference to FIG. 1, spark plug 100 according to the present invention in FIG. 2 has an optoelectric converter 115 that is disposed directly inside spark plug 100. Optoelectric converter 115 converts optical signals, received from the interior of spark plug 100, directly into corresponding electrical signals that are forwarded via a signal cable (not further designated in FIG. 2) to a downstream electronic evaluation system 140. As is evident from FIG. 2, evaluation unit 140 can also be disposed in a common control unit 200 together with a light source 150 supplying spark plug 100. Control unit 200 can also be, for example, a control device that coordinates the operation of an internal combustion engine having spark plug 100 according to the present invention and that accordingly also controls further spark plugs 100 associated with other combustion chambers of the internal combustion engine. An optical distributor that may be necessary for the distribution of pump light or the like from light source 150 to the multiple spark plugs 100 is not illustrated in FIG. 2.

The particular advantage of spark plug 100 according to the present invention as shown in FIG. 2 is that a signal conversion to electrical signals is accomplished directly at the location where operating data of spark plug 100 are acquired optically, so that no damping losses occur as a result of optical forwarding of the operating data. Also conceivable in addition is an at least partial preprocessing of the electrical signals, in particular a preamplification, locally in spark plug 100. An electronic system required for this purpose is advantageously integrated into a single module together with optoelectric converter 115.

Like first end 120*a* of separate light guide device 120 illustrated in FIG. 1, optoelectric converter 115 of FIG. 2 can be disposed so that it receives laser pulses emitted directly from the ignition laser, as well as light coupled through combustion chamber window 130 into the interior of spark plug 100 according to the present invention.

It is furthermore possible to provide multiple optoelectric converters 115 inside spark plug 100 according to the present invention, or also to provide an optical system (not depicted), upstream from converter 115, that images onto optoelectric converter 115 both light coupled in through combustion chamber window 130 and laser light deriving from the ignition laser.

Analogously therewith, in the case of the exemplifying embodiment according to FIG. 1 as well, it is possible to provide more than one separate light guide device 120 or a special optical system, which is associated with first end 120*a* of separate light guide device 120 and performs an imaging of light from the combustion chamber and/or from the ignition laser of spark plug 100.

A third embodiment of the invention is described below with reference to FIG. 3.

Figure 3:
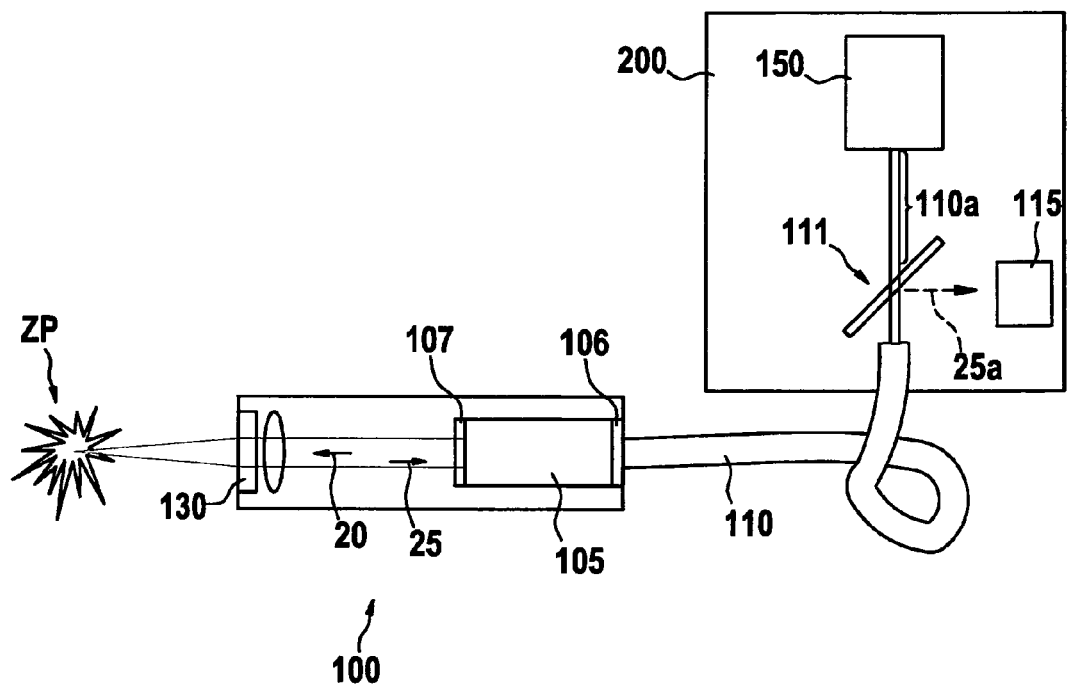
FIG. 3 shows a third embodiment of the spark plug according to the present invention.

Spark plug 100 according to the present invention illustrated in FIG. 3 has an integrated ignition laser, which encompasses, inter alia, an incoupling mirror 106, an outcoupling mirror 107, and laser-active solid 105 arranged therebetween and already described, and thus constitutes an oscillator that, after sufficient impingement of pump light coupled in from light source 150 via light guide device 110, emits laser pulses 20.

Mirrors 106, 107 delimiting the oscillator are, as in the case of conventional ignition lasers, transparent to the pump light, which can have a wavelength e.g. from approximately 790 nm to approximately 990 nm, and are very largely reflective with respect to the wavelength(s) of the laser pulses 20 that are generated, which lie e.g. in a region from approximately 1000 nm to approximately 1550 nm. Only outcoupling mirror 107 exhibits a transmission coefficient that is sufficiently large for laser pulses 20 to allow any laser pulses 20 at all to be emitted into the combustion chamber.

According to the present invention, the entire ignition laser, i.e. in particular components 105, 106, 107, is at least partially transparent to light of a wavelength region of interest that is irradiated from the combustion chamber into the interior of spark plug 100. The wavelength region of interest may extend from approximately 200 nm to approximately 900 nm, and the transparency according to the present invention in this wavelength region enables light 25 deriving from the combustion chamber to be conveyed through light guide device 110 to an optoelectric converter 115.

Spark plug 100 illustrated in FIG. 3 further encompasses an optical beam splitter 111, associated with light guide device 110, for separating light 25, 25*a* from the combustion chamber and the pump light of light source 150.

Except for a first segment 110*a* of light guide 110, light guide device 110 is accordingly used in double fashion: by the pump light necessary for operation of the ignition laser; and by light that is emitted e.g. from fuel combusting in the combustion chamber and is coupled through combustion chamber window 130 and the ignition laser (transparent thereto) into light guide device 110, and that furnishes operating data of interest in optical form.

The transparent design of the ignition laser in the case of the spark plug according to FIG. 3 makes possible a particularly compact configuration of spark plug 100.

According to a further very advantageous embodiment of the invention, an electrical signal furnished by optoelectric converter 115, 115' is evaluated in the course of a filtration. The filtration can be accomplished, in particular, by way of suitable bandpass filters or a corresponding signal processing system or the like, and advantageously takes into consideration the various phases during the operation of spark plug 100 according to the present invention, for example on the one hand the generation and emission of a laser pulse 20 from spark plug 100 through combustion chamber window 130 onto an ignition point ZP located outside spark plug 100, and on the other hand a subsequent combustion process in the combustion chamber of the internal combustion engine, in which process, in particular, ultraviolet light 25 is emitted from the combusting air/fuel mixture and couples at least in part through combustion chamber window 130 into the interior of spark plug 100 according to the present invention.

In order to check light source 150 or the ignition laser, or the proper generation of a laser pulse 20 in general, the signal furnished by optoelectric converter 115, 115' can, for example, be evaluated in a first monitoring time window that is located around a presumed ignition time. If no optical signal that implies the occurrence of a laser pulse 20 is detected in said monitoring time window, a corresponding fault can be entered, for example, in electronic evaluation system 140. It is additionally possible, using the sensor arrangement according to the present invention, to identify accurately an actual point in time at which laser pulse 20 occurs, and to convey it e.g. to control unit 200 for diagnostic purposes.

In addition to the checking of light source 150 and of the ignition laser, light 25, 25a produced on the basis of any subsequent combustion of the air/fuel mixture in the combustion chamber can also be evaluated by optoelectric converter 115, 115'.

A bandpass filter can be provided for separation of the comparatively high-frequency laser pulses 20 from the light 25, 25a produced as a result of combustion in the combustion chamber, and for separation of the corresponding electrical signals, said filter having a correspondingly high center frequency and also filtering low-frequency interference signals in addition to the signals that correspond to combustion-chamber light 25, 25a.

A further bandpass filter of corresponding center frequency can likewise be used to select combustion-chamber light 25, 25a or the corresponding electrical signals.

Because of the separation in time between the occurrence of laser pulse 20 and a combustion event that occurs only thereafter, the particular signal of interest can also be selected simply by way of appropriate time-based windowing. A combination of the above-described filtration with selection of a time window of interest, or a time-based switchover between bandpass filters having different center frequencies, is also possible.

Advantageously, on the one hand spark plug 100 according to the present invention, and a sensor arrangement 115, 115', 120 disposed therein, enable monitoring of the generation of a laser pulse 20, and on the other hand a combustion event taking place in the combustion chamber of the internal combustion engine can also be monitored.

An optical system 30 (FIG. 1) that may be present for the focusing of laser pulses 20, and combustion chamber 130, are, like the ignition laser in the embodiment of the present invention according to FIG. 3, also to be made transparent to wavelengths of interest of light 25, 25a that derives from the combustion chamber.

What is claimed is:

1. A spark plug device for an internal combustion engine, comprising:
   a spark plug;
   a light guide device for supplying an ignition laser integrated into the spark plug with pump light, wherein the ignition laser is at least partially transparent to light of a first wavelength region that is radiated from a combustion chamber into the spark plug, the first wavelength region extending from approximately 200 nm to approximately 900 nm; and
   an optical beam splitter, associated with the light guide device, for separating light of the first wavelength region from the pump light.

2. A method for operating a spark plug for an internal combustion engine, the method comprising:
   using a light guide device of the spark plug for supplying the spark plug with pump light, the spark plug having an integrated ignition laser that is at least partially transparent to light of a first wavelength region that is radiated from a combustion chamber into the spark plug, the first wavelength region extending from approximately 200 nm to approximately 900 nm; and
   acquiring operating data of at least one of the spark plug and a combustion chamber associated with the spark plug by an optical beam splitter, associated with the light guide device, for separating light of the first wavelength region from the pump light.

3. The method of claim 2, wherein the light of the first wavelength region separated from the pump light by the optical beam splitter is conveyed through the light guide device to an optoelectric converter, and the operating data is converted into an electrical signal by the optoelectric converter.

4. The method of claim 3, wherein the electrical signal is subjected to a filtration.

5. The spark plug device of claim 1, wherein the ignition laser is configured as an oscillator that, upon receiving pump light from the light guide device, emits at least one laser pulse.

6. The spark plug device of claim 1, wherein the ignition laser comprises an incoupling mirror, an outcoupling mirror, and a laser-active solid arranged therebetween.

7. The spark plug device of claim 6, wherein the incoupling mirror and the outcoupling mirror are substantially transparent to the pump light having a pump wavelength region extending from approximately 790 nm to approximately 990 nm, and are substantially reflective of laser pulses having an oscillation wavelength region extending from approximately 1000 nm to approximately 1550 nm.

8. The spark plug device of claim 6, wherein the outcoupling mirror is configured to emit laser pulses into the combustion chamber.

9. The spark plug device of claim 6, wherein the incoupling mirror, the outcoupling mirror, and the laser-active solid arranged therebetween are substantially transparent to light of the first wavelength region that is radiated from the combustion chamber into the spark plug, the first wavelength region extending from approximately 200 nm to approximately 900 nm.

10. The spark plug device of claim 1, further comprising:
    an optoelectric converter configured to receive the light of the first wavelength region separated from the pump light by the optical beam splitter via the light guide device.

11. The spark plug device of claim 1, further comprising:
    an optical system configured to focus laser pulses of the ignition laser; and
    a combustion chamber window configured to receive the laser pulses of the ignition laser;
    wherein the optical system and the combustion chamber window are at least partially transparent to light of the first wavelength region that is radiated from the combustion chamber into the spark plug, the first wavelength region extending from approximately 200 nm to approximately 900 nm.

* * * * *